United States Patent [19]

Watson

[11] Patent Number: 4,581,951
[45] Date of Patent: Apr. 15, 1986

[54] TRANSMISSION SHIFTER
[75] Inventor: Ronald E. Watson, Lansdale, Pa.
[73] Assignee: Hurst Performance, Inc., Warminster, Pa.
[21] Appl. No.: 546,328
[22] Filed: Oct. 28, 1983
[51] Int. Cl.[4] .................... G05G 9/12; F16C 11/06
[52] U.S. Cl. ........................ 74/473 R; 74/473 P
[58] Field of Search ..................... 74/473 R, 473 P

[56] References Cited
U.S. PATENT DOCUMENTS

| | | | |
|---|---|---|---|
| 2,195,270 | 3/1940 | Dolza | 74/473 R |
| 3,008,342 | 11/1961 | Brunot | 74/473 R |
| 3,465,851 | 9/1969 | Callegari et al. | 74/473 R |
| 4,333,360 | 6/1982 | Simmons | 74/473 R X |
| 4,497,396 | 2/1985 | Davis | 74/473 R X |

FOREIGN PATENT DOCUMENTS 325263 2/1930 United Kingdom ............ 74/473 R

*Primary Examiner*—William E. Tapolcai
*Attorney, Agent, or Firm*—Brooks & Kushman

[57] ABSTRACT

A transmission shifter (12) for controlling a transmission includes a pair of independent spring biasers (30,32) mounted by a housing (18) to bias an operating member (22) of the shifter and respectively control lateral movement of the operating member in opposite lateral directions independently of each other. Each spring biaser (30,32) preferably includes at least one helical spring (34,36 and 38) for providing the biasing with the lateral bias of one spring biaser greater than that of the other. One of the helical spring biasers (30) includes a pair of helical springs (34,36) one of which has a larger diameter and receives the other, and the other spring biaser (32) includes a single helical spring (38) identical to the larger spring (34) of the one biaser (30). The shifter (12) also includes a ball and pin construction (42,44) for mounting the operating member (22) and a seat and shim arrangement (56,60 and 58,62) for mounting the spring biasers.

12 Claims, 5 Drawing Figures

TRANSMISSION SHIFTER

TECHNICAL FIELD

This invention relates to a transmission shifter for controlling a transmission to provide shifting between different gears.

BACKGROUND ART

Transmission shifters are conventionally utilized to provide manual actuation for shifting a transmission between different gears to control the driving torque delivered from a vehicle engine to the wheels. These shifters normally include a housing mounted on the transmission and an operating member mounted by the housing for movement that controls the transmission shifting. A lower end of the operating member projects downwardly from the housing to actuate the transmission shifting, while an upper end projects upwardly from the housing to support a shift lever whose movement is normally considered to define the pattern of shifting since such movement is that which is familiar to the vehicle operator. A single spring normally positions the operating member in a neutral position such that lateral movement with respect to the shifter housing and vehicle to effect shifting requires the same force in both directions from the neutral position.

DISCLOSURE OF THE INVENTION

An object of the present invention is to provide an improved transmission shifter for controlling a transmission such that lateral movement of the shifter operating member in opposite lateral directions is controlled by a pair of independent spring biasers. Such a shifter construction permits the lateral movement in opposite directions to be resisted by different force levels. The shifter operating member can thus be biased such that lateral movement for shifting to a normal drive position is more easily performed than lateral movement for shifting to a less frequent drive position such as an overdrive position or reverse.

The shifter constructed in accordance with the invention includes a housing adapted to be mounted with respect to the transmission and having longitudinal and lateral axes which respectively correspond to longitudinal and lateral axes of the vehicle driven by the transmission. An operating member of the shifter has a lower end that projects downwardly from the housing to control the transmission shifting and has an upper end that extends upwardly from the housing to be operated by a shift lever. An intermediate portion of the operating member is mounted by the housing to support the operating member for movement longitudinally and laterally with respect to the housing in order to effect the shifting. A pair of independent spring biasers are mounted by the housing and bias the operating member to respectively control lateral movement thereof in opposite lateral directions independently of each other.

In the preferred construction, each spring biaser includes at least one helical spring for biasing the operating member of the shifter. One of the helical spring biasers provides a greater resistance to movement of the operating member in one lateral direction than the other spring biaser does in the other lateral direction. This greater bias of the one helical spring biaser is preferably provided by a pair of helical springs, one of which has a larger diameter and receives the other in a concentric relationship. The other spring biaser preferably includes a single helical spring which is identical to the larger spring of the one helical spring biaser having two springs. However, it should be understood that in accordance with the broadest practice of the invention, each spring biaser can also include a single spring with one of the single springs having a greater bias than the other.

In the preferred construction of the shifter, the housing includes an upwardly opening lower member and the operating member includes a ball received within the lower member of the housing to support the operating member for its longitudinal and lateral movement. A pin projects laterally from the ball and has opposite ends respectively engaged by the pair of spring biasers. An upper cover member of the housing is secured to the lower housing member and mounts the spring biasers.

In the most preferred construction, the cover member of the shifter housing includes a pair of upwardly extending seats that respectively mount the pair of spring biasers to provide positioning thereof in the assembled condition. Each spring biaser also includes a shim at its lower end that engages the associated pin end projecting outwardly from the ball. A projection is also preferably provided on each shim for providing positioning thereof with respect to the associated spring biaser. These shim projections are disclosed as being respectively received within the lower ends of the associated helical springs to provide such positioning. Two different size projections are utilized, one of which is smaller and is received within the lower end of the smaller helical spring of the spring biaser that provides the greater resistance to lateral movement, and the other of which is larger and is received within the lower end of the single helical spring of the spring biaser that provides the lesser resistance to movement.

At its upper extremity, the shifter inccludes a flexible boot that encloses the upper cover member of the housing and a portion of the upper end of the operating member. As the operating member is moved to effect shifting of the associated transmission, the boot flexes to permit such movement while still maintaining the upper extremity of the shifter sealed to prevent the entry of dirt, moisture, or other foreign matter.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
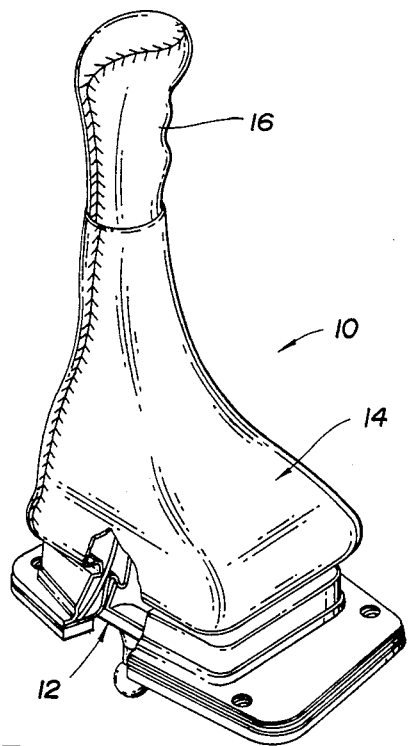
FIG. 1 is a partially broken away perspective view of a transmission shifter assembly which includes a transmission shifter constructed in accordance with the present invention.

With reference to FIG. 1 of the drawings, a transmission shifter assembly is indicated generally by 10 and includes a transmission shifter 12 that is constructed in accordance with the present invention. Shifter assembly 10 includes a flexible boot 14 that covers the transmission shifter 12 and also includes a shift lever that operates the transmission shifter. This shift lever has a lower end which is connected to the transmission shifter as is hereinafter more fully described and has an upper end that supports a manually grasp knob 16 whose movement operates the shifter.

Figure 2:
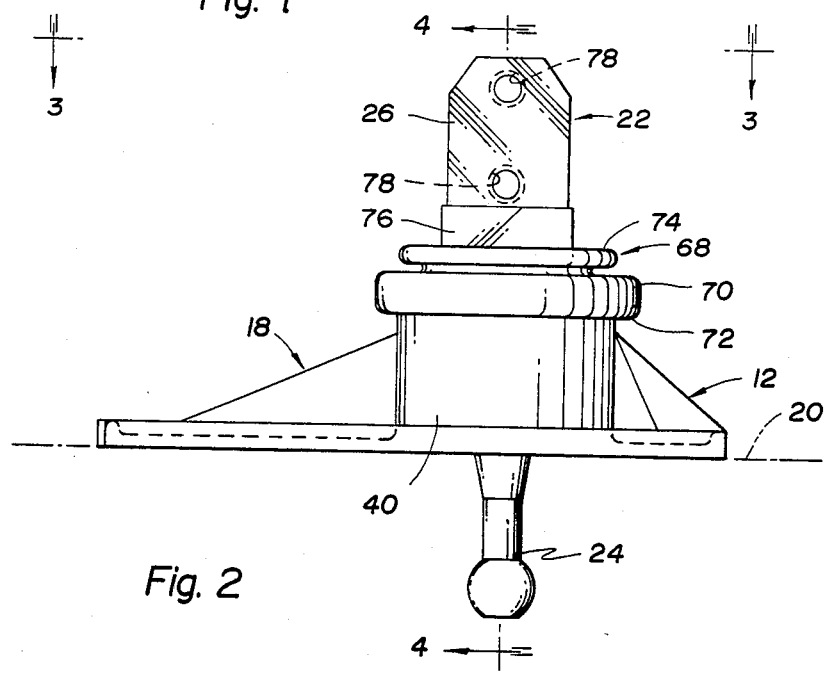
FIG. 2 is a side view of the transmission shifter.
Figure 3:
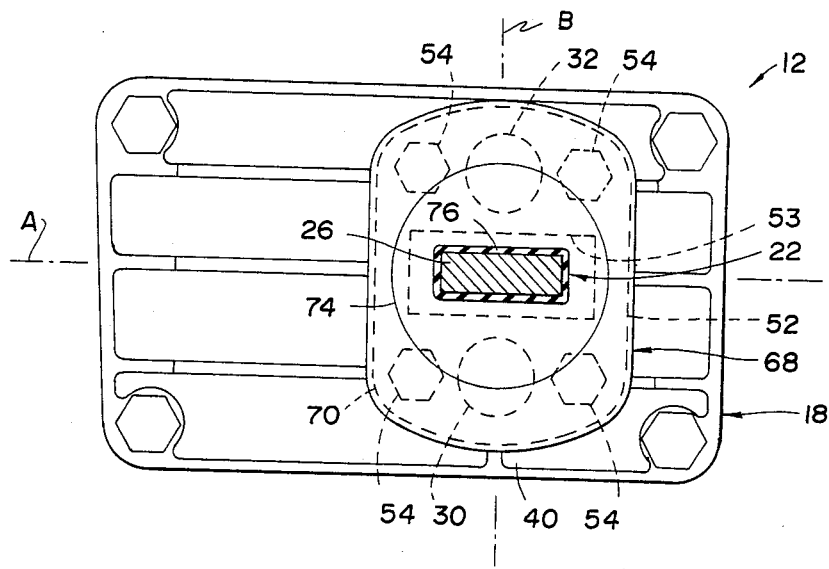
FIG. 3 is a top plan view of the transmission shifter taken along the direction of line 3—3 in FIG. 2.
Figure 4:
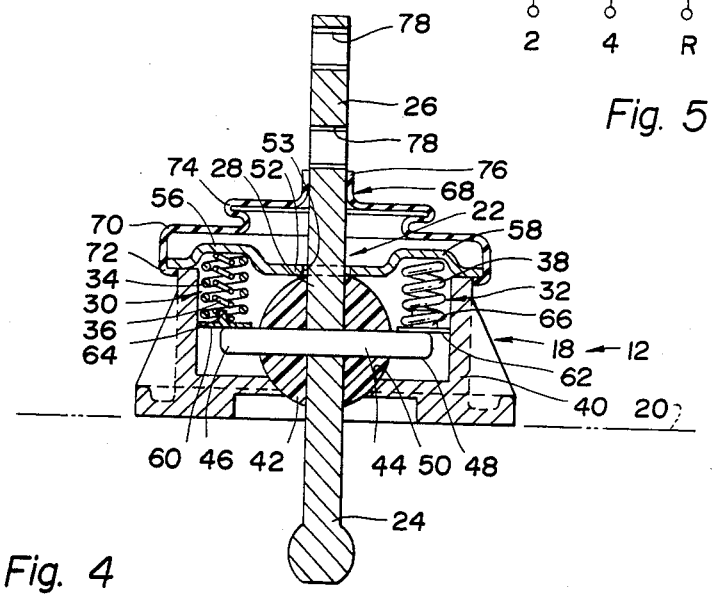
FIG. 4 is an elevation view taken in section through the transmission shifter along line 4—4 in FIG. 2.

With reference to FIGS. 2, 3 and 4, transmission shifter 12 includes a housing 18 adapted to be mounted with respect to an associated transmission schematically indicated by 20. Shifter housing 18 includes a longitudinal axis A illustrated in FIG. 3 and a lateral axis B that extends perpendicular to the longitudinal axis A. An operating member 22 of the shifter has a lower end 24 that projects downwardly from the housing 18 to control shifting of the transmission 20. An upper end 26 of the operating member 22 extends upwardly from the housing to be operated by the shift lever which is manually moved by the knob 16 illustrated in FIG. 1. An intermediate portion 28 of operating member 22 is illustrated in FIG. 4 and mounted by the housing 18 in a manner which is hereinafter more fully described to support the operating member for movement longitudinally and laterally with respect to the housing along axes A and B shown in FIG. 3. A pair of independent spring biasers 30 and 32 are mounted by the shifter housing 18 and bias the operating member 22 to respectively control lateral movement thereof in opposite lateral directions along axis B independently of each other.

Figure 5:
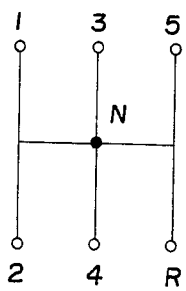
FIG. 5 is a schematic view illustrating one transmission shift pattern.

Provision of the pair of independent spring biasers 30 and 32 permits different force levels to be required to move the shift lever knob 16 laterally to effect transmission shifting. This can be particularly advantageous in controlling shifting to prevent inadvertent shifting to an unintended position. For example, with reference to the shift pattern illustrated in FIG. 5, the neutral position is located longitudinally between third and fourth gears laterally to the right from the longitudinal path between first and second gears. With the shifter of this invention, it is possible to permit easier lateral shifting toward the left from neutral position for shifting into first or second gear while requiring a greater effort to shift laterally toward the right for shifting into the overdrive fifth gear or reverse gear.

With reference to FIG. 4, spring biasers 30 and 32 each include at least one helical spring and the one helical spring biaser 30 provides a greater resistance to movement of the operating member 18 in a lateral direction that tends to compress this spring biaser than does the other spring biaser 32 in the other lateral direction. To provide this greater biasing force, spring biaser 30 includes a pair of helical springs 34 and 36, with the one spring 34 having a larger diameter, and with the smaller spring 36 being received within the larger spring in a concentric relationship. The other spring biaser 32 includes a single helical spring 38 identical to the larger spring 34 of the helical spring biaser 30. Helical springs 34 and 36 of spring biaser 30 and helical spring 38 of spring biaser 32 cooperate to normally position the operating member 22 in its neutral position while permitting easier lateral movement in one direction than the other such as in the manner described above in connection with FIG. 5.

As best illustrated in FIG. 4, the shifter housing 18 includes a lower member 40 of an upwardly opening configuration that is preferably provided by an aluminum casting process. The operating member 22 includes a plastic ball 42 that is received within the lower member 40 of housing 12 to support the intermediate portion 28 of the operating member in order to permit the longitudinal and lateral movement of the operating member by actuation of its upper end 26 by the associated shift lever. A pin 44 projects laterally through the intermediate portion 28 of operating member 22 and through the ball 42 and has opposite ends 46 and 48 respectively engaged by the spring biasers 30 and 32 so as to thereby provide the biasing. Plastic ball 42 is preferably made in half sections with a center parting line along the center of the operating member 22 as viewed in FIG. 4. The half sections of ball 42 and the pin 44 have a relatively snug fit in order to maintain the relationship thereof prior to assembly whereupon the lower part of the ball is received by a housing seat 50 of an annular shape and the pin ends are engaged by the spring biasers as previously described.

As seen in FIG. 4, shifter housing 18 also includes an upper cover member 52 that is secured to the lower housing member by bolts 54 illustrated in FIG. 3. Operating member 22 projects upwardly through an opening 53 in the cover member 52 as shown in FIG. 4. Cover member 52 mounts the pair of spring biasers 30 and 32 by a pair of seats 56 and 58 that extend upwardly to form recesses for receiving the upper ends of the associate helical springs. Thus, the upper ends of helical springs 34 and 36 of spring biaser 30 are received by the seat 56, while the upper end of the helical spring 38 of spring biaser 32 is received by the seat 58.

With continued reference to FIG. 4, the lower ends of helical spring biasers 30 and 32 each include an associated shim 60 and 62 that engages the adjacent pin end 46 or 48. Shims 60 and 62 respectively include positioners 64 and 66 for providing positioning thereof with respect to the associated spring biasers 30 and 32. The projection 64 of shim 60 is received within the lower end of the smaller spring 36 of spring biaser 30, while the projection 66 of shim 62 is received within the lower end of the spring 38 of spring biaser 32. These shim projections 64 and 66 thus cooperate with the seats 56 and 58 in positioning the helical springs such that the spring biasers engage and bias the pin ends 46 and 48 to provide the lateral biasing of the operating member 22.

As illustrated in FIGS. 3 and 4, the shifter also includes a flexible boot 68 made of a suitable elastomeric material. Boot 68 includes a lower portion 70 having a flange 72 that is snapped over the periphery of cover member 52. An intermediate bellows portion 74 of boot 68 is connected to the lower portion 70 and permits both lateral and longitudinal movement of the operating member 22 during shifting. From the intermediate bellows portion 74, an upper portion 76 of boot 68 seals the lower extremity on the upper portion 26 of operating member 22. Threaded holes 78 are provided in the upper portion 26 of the operating member 22 to permit connection of the shift lever at a location above the boot.

While the best mode for carrying out the invention has been described in detail, those familiar with the art to which this invention relates will recognize various alternatives, designs and embodiments for practicing the invention as defined by the following claims.

What is claimed is:

1. A transmission shifter for controlling a transmission, the shifter comprising: a housing adapted to be mounted with respect to the transmission and having longitudinal and lateral axes; an operating member having a lower end that projects downwardly from the housing to control the transmission, an upper end that extends upwardly from the housing to be operated by a shifter lever, and an intermediate portion mounted by the housing to support the operating member for movement longitudinally and laterally with respect to the housing; and a pair of independent spring biasers mounted by the housing to bias the operating member and respectively control lateral movement thereof in opposite lateral directions independently of each other, with one of the biasers providing a greater resistance to movement in one lateral direction than the other biaser does in the other lateral direction.

2. A shifter as in claim 1 wherein each spring biaser includes at least one helical spring and wherein one of the helical spring biasers provides the greater resistance to movement of the operating member in one lateral direction than the other spring biaser does in the other lateral direction.

3. A shifter as in claim 2 wherein said one helical spring biaser includes a pair of helical springs one of which has a larger diameter and receives the other.

4. A shifter as in claim 3 wherein the other spring biaser includes a single helical spring identical to the larger spring of said one helical spring biaser.

5. A shifter as in claim 1, 2, 3, or 4 wherein the housing includes an upwardly opening lower member, the operating member including a ball received within the lower member of the housing to support the operating member for longitudinal and lateral movement, a pin that projects laterally from the ball and has opposite ends respectively engaged by the pair of spring biasers, and the housing including an upper cover member that is secured to the lower housing member and mounts the pair of spring biasers.

6. A shifter as in claim 5 wherein the upper cover member of the housing includes a pair of upwardly extending seats that respectively mount the pair of spring biasers.

7. A shifter as in claim 5 wherein each spring biaser includes a shim that engages the associated pin end.

8. A shifter as in claim 7 wherein each shim includes a projection for providing positioning thereof with respect to the associated spring biaser.

9. A shifter as in claim 5 further including a flexible boot that encloses the upper cover member of the housing.

10. A transmission shifter for controlling a transmission, the shifter comprising: a housing adapted to be mounted with respect to the transmission and having longitudinal and lateral axes; an operating member having a lower end that projects downwardly from the housing to control the transmission, an upper end that extends upwardly from the housing to be operated by a shifter lever, and an intermediate portion having a ball mounted by the housing to support the operating member for movement longitudinally and laterally with respect to the housing; a pin having opposite ends projecting laterally from the ball in opposite directions; and a pair of independent helical spring biasers that are mounted by the housing and respectively engage the opposite ends of the pin to control lateral movement of the operating member in opposite lateral directions, with one of the biasers providing a greater resistance to movement in one lateral direction than the other biaser does in the other lateral direction.

11. A transmission shifter for controlling a transmission, the shifter comprising: a housing adapted to be mounted with respect to the transmission and having longitudinal and lateral axes; said housing having an upwardly opening lower member and an upper cover member; an operating member having a lower end that projects downwardly from the housing to control the transmission, an upper end that extends upwardly from the housing to be operated by a shifter lever, and an intermediate portion having a ball mounted in the lower portion of the housing below the upper cover member to support the operating member for movement longitudinally and laterally with respect to the housing; a pin having opposite ends projecting laterally from the ball in opposite directions; a pair of independent helical spring biasers that respectively engage the opposite ends of the pin to control lateral movement of the operating member in opposite lateral directions, with one of the biasers providing a greater resistance to movement in one lateral direction than the other biaser does in the other lateral direction; and a boot that encloses the upper cover member of the housing.

12. A transmission shifter for controlling a transmission, the shifter comprising: a housing adapted to be mounted with respect to the transmission and having longitudinal and lateral axes; said housing having an upwardly opening lower member, an upper cover member having a pair of laterally spaced seats, and bolts that secure the upper cover member to the lower member; an operating member having a lower end that projects downwardly from the housing to control the transmission, an upper end that extends upwardly from the housing to be operated by a shifter lever, and an intermediate portion having a ball mounted in the lower portion of the housing below the upper cover member to support the operating member for movement longitudinally and laterally with respect to the housing; a pin having opposite ends projecting laterally from the ball in opposite directions; a pair of independent helical spring biasers respectively mounted by the pair of laterally spaced seats and respectively engaged with the opposite ends of the pin to control lateral movement of the operating member in opposite lateral directions; one of the spring biasers including a pair of helical springs one of which has a larger diameter and receives the other; the other spring biaser including a single helical spring identical to the larger spring of the one biaser such that the one biaser provides a greater resistance to movement in one lateral direction than the other biaser does in the other lateral direction; each spring biaser including a shim that engages the associated pin end; and a flexible boot that encloses the upper cover member of the housing.

* * * * *